United States Patent [19]  
Moritz et al.

[11] Patent Number: 5,038,556
[45] Date of Patent: Aug. 13, 1991

[54] GUIDE CHAINS FOR FEED LINES

[75] Inventors: Werner Moritz, Siegen; Volker Jud, Wilnsdorf; Herbert Wehler, Neunkirchen; Karl-Georg Wisser, Luckenbach; Willibald Weber, Netphen; Paul-Werner Mack, Wenden, all of Fed. Rep. of Germany

[73] Assignee: Kabelschlepp Gesellschaft mit beschränkter Haftung, Siegen, Fed. Rep. of Germany

[21] Appl. No.: 481,341

[22] Filed: Feb. 16, 1990

[30] Foreign Application Priority Data

Feb. 18, 1989 [DE] Fed. Rep. of Germany ... 8901955[U]

[51] Int. Cl.$^5$ ............................................... F16G 13/16
[52] U.S. Cl. ....................................... 59/78.1; 59/900; 248/49
[58] Field of Search ..................... 59/78, 78.1, 900; 248/49, 50, 51, 78; 474/206

[56] References Cited

U.S. PATENT DOCUMENTS

| 4,626,233 | 12/1986 | Moritz | 474/206 |
| 4,800,714 | 1/1989 | Moritz | 248/49 |
| 4,813,224 | 3/1989 | Blase | 59/78.1 |
| 4,833,876 | 5/1989 | Kitao et al. | 248/49 |

FOREIGN PATENT DOCUMENTS

| 1932428 | 1/1971 | Fed. Rep. of Germany. | |
| 2255283 | 5/1974 | Fed. Rep. of Germany. | |
| 8213664 | 8/1982 | Fed. Rep. of Germany | 59/78 |
| 3730586 | 11/1988 | Fed. Rep. of Germany. | |

Primary Examiner—David Jones
Attorney, Agent, or Firm—Robert W. Becker & Associates

[57] ABSTRACT

A feeder chain for the supply of all types of consumable material to units that move on tracks. The chain comprises a plurality of chain links and has a continuous inner space for feed lines, whereby the chain links have pivotably interconnected outer side pieces that are provided with stops for delimiting the mutual pivot angle. Each chain link is provided with two detachable crosspieces for interconnecting the outer side pieces thereof. The crosspieces are tubular pieces that are insertable via a force fit onto projections of the outer side pieces.

10 Claims, 7 Drawing Sheets

GUIDE CHAINS FOR FEED LINES

BACKGROUND OF THE INVENTION

The present invention relates to a guide or feeder chain for the supply of all types of consumable material to units that move on tracks, with the chain comprising a plurality of chain links and having a continuous inner space for feed lines, whereby the chain links have pivotably interconnected outer side pieces that are provided with stop means to delimit the mutual pivot angle, with each chain link being provided with two detachable crosspieces for interconnecting the outer side pieces thereof.

German Patent No. 19 32 428 discloses a feed chain where the side pieces of the chain links are integrally interconnected by a crosspiece that has an opening for the feed lines. With this known feed chain, the ability to receive feed lines is limited by the size of the opening in the crosspiece. When the capacity of the feeder chain has been exhausted, another chain with completely new chain links must be made available, so that with this known state of the art, the manufacturing and storage expenses are particularly high due to the different requirements that result during use.

Due to the aforementioned reasons, feeder chains of the initially mentioned type have become known where the width of the chain links, and hence the width of the inner space that receives the feed lines, can be changed by exchanging or altering detachable crosspieces that interconnect the outer side pieces of the chain links. German Patent No. 37 30 586 discloses a link chain of this type where the crosspieces, in order to effect the detachable connection of the outer side pieces, each comprise a central portion of adjustable length, and two end pieces that can be securely connected thereto and that cooperate with the outer side pieces of the chain links. Unfortunately, this construction is relatively expensive, because each crosspiece is formed from three relatively complicated individual parts, with the two end pieces being insertable into the ends of the central portion in order to form a locking connection therewith. In addition, the ends of the end pieces that are connectable to the outer side pieces are embodied as expensive plug-type elements for a locking connection, and can furthermore be provided with a screw connection to the outer side pieces.

German Patent No. 22 55 283 discloses a feeder chain having separable crosspieces comprised of at least two traverses and separating elements that are disposed therebetween. With this known feeder chain, the traverses have a flattened crosssectional configuration with rounded-off narrow sides, with gated recesses that are provided with undercuts being disposed on the upper and lower ends of the separating elements, so that after being placed into the recesses, the traverses can be secured in a positive and form-locking manner with the separating elements by being twisted about their longitudinal axes.

Proceeding from the above, it is an object of the present invention to provide an improved guide or feeder chain that has detachable crosspieces, whereby in particular the construction of the crosspieces, and their connection with the outer side pieces, is simplified.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The guide or feeder chain of the present invention is characterized primarily in that the crosspieces that interconnect the outer side pieces of a chain link are tubular pieces, at least one of which is insertable via a force fit onto projections that are provided on the outer side pieces.

Thus, with a feeder chain constructed pursuant to the present invention the crosspieces are formed by tubular pieces, the hollow interior of which, at least in the end regions, receives projections that are integrally formed on the inner walls of the outer side pieces. In this connection, the interior of the tubular pieces is undersized while the outside of the projections is oversized, so that when the tubular pieces are inserted on the projections, a force fit, i.e. a secure connection, results. As an alternative, the force fit can also be produced via a shrink fit of the tubular pieces.

The present invention has the advantage that the crosspieces can be cut to length from conventional tubes for a respective need, whereby not only plastic but also metallic tubes can be used. Thus, with the present invention it is not necessary to use different tools, especially different extrusion dyes, to produce different crosspieces for the feeder chain. In addition, the structural expense with regard to the outer side pieces of the chain links is also low, because it is merely necessary for these outer side pieces to have projections that have a straightforward, smooth shape. Finally, the assembly and removal of the chain links is also simplified because for this purpose it is merely necessary for the tubular pieces to be placed or pressed upon the projections or to be pulled therefrom. The assembly or removal can be even further simplified by using a simple pressing device.

Pursuant to one preferred specific embodiment of the present invention, the tubular pieces, while having an approximately constant thickness, are flattened on two oppositely disposed outer sides, and are rounded-off on two other oppositely disposed outer sides, with the distance between the flattened outer sides being less than the distance between the rounded-off outer sides; the corresponding projections have their flattened outer sides disposed parallel to the longitudinal narrow sides of the outer side pieces. As a consequence of this construction, a feeder chain having a relatively large inner space for feed lines is provided because the tubular pieces, which have their flattened sides oriented in the longitudinal direction of the chain, take up only a small portion of the height of the chain links due to the relatively small distance between the flattened sides of the tubular pieces. At the same time, a very strong and torsionally rigid connection is achieved between the outer side pieces of the chain links, especially because the relatively great distance between the rounded-off outer sides of the tubular pieces brings about a relatively high moment of resistance, and in the region of the flattened outer sides a large contact surface exists between the tubular pieces and the projections.

Pursuant to one practical specific embodiment, each chain link is provided with one tubular piece that has a longitudinal slot, and one unslotted tubular piece, whereby the longitudinally slotted tubular pieces of all of the chain links are disposed on only one side of the chain. The slotted tubular pieces can be easily widened and withdrawn from the projections of the outer side pieces, as a result of which one side of the feeder chain can be opened to permit simple placement of feed lines therein. For this purpose, it is not necessary to press the outer side pieces apart, as is the case if only unslotted tubular pieces are used and the projections have the same length on both sides of the chain. When the feed lines are placed in the chain, the longitudinally slotted tubular pieces of the completely assembled feeder chain essentially serve to guide the feed lines, although they also contribute to the stability of the chain links. However, the unslotted tubular pieces make a greater contribution to the stability because these unslotted tubular pieces are subjected to practically no deformation under load.

With a feeder chain having tubular pieces that are flattened on two opposite outer sides and are rounded-off on two other opposite outer sides, the longitudinal slot is preferably disposed on a rounded-off side of the tubular piece, so that the longitudinally slotted tubular piece can be withdrawn in the longitudinal direction of the feeder chain without entering into the inner spaces of the link chain occupied by the feed lines.

The inventive feeder chain can also be easily opened for placing feed lines therein if the longitudinal slot is disposed on a flattened outer side of the tubular piece and has approximately the same dimension in the longitudinal direction of the link chain. Due to the considerable span of the longitudinal slot, the tubular piece can be easily pressed onto or withdrawn from the projections in a direction perpendicular to a plane that passes through the joints of the chain when it is in a stretched or extended condition. The tubular pieces are preferably installed in such a way that the longitudinal slots are open in a direction toward the interior of the link chain, so that when they are being pressed on or withdrawn, the tubular pieces do not have to be introduced into the inner space of the chain. If in addition a rounded-off outer side of the tubular piece has a longitudinal groove, the tubular piece can be removed from the projections by introducing a screwdriver into the longitudinal groove.

Pursuant to another practical embodiment of the present invention, the projections of the outer side pieces that ar associated with the longitudinally slotted tubular pieces are shorter than the projections that ar associated with the unslotted tubular pieces, so that the cross-sectional area that is available for the introduction of feed lines is relatively large when the longitudinally slotted tubular pieces are removed from the link chain.

Pursuant to a further specific embodiment of the present invention, the end links of the chain that form the connectors have a tubular piece that connects the outer side pieces and that is provided with a securement tongue for securement to a fixed connection or a movable consuming device. The securement tongues enable the transfer of force over a large surface between the feeder chain and a connection or consuming device that withstands the entire chain weight and the dynamic stresses that occur during operation.

Pursuant to an alternative embodiment of the inventive feeder chain for a simple opening for the placement of feed lines therein, one of the two crosspieces that is embodied as a tubular piece is adapted to be inserted into gated recesses of the outer side pieces that are provided with undercuts. The dimensions between the tubular pieces and the recesses can be such that after being placed in the recesses, the tubular pieces can be secured with the outer side pieces in a positive and form-locking manner by being twisted about their longitudinal axes. The connection between the other tubular piece and the outer side pieces is effected in the same manner as with the preceding embodiments.

Finally, it is proposed pursuant to another specific embodiment of the present invention, that the tubular pieces be made of a lightweight metal, so that a very stable feeder chain can also be achieved while providing a lightweight chain.

Further specific features of the present invention will be described in detail subsequently.

DESCRIPTION OF PREFERRED EMBODIMENTS

Figure 1:
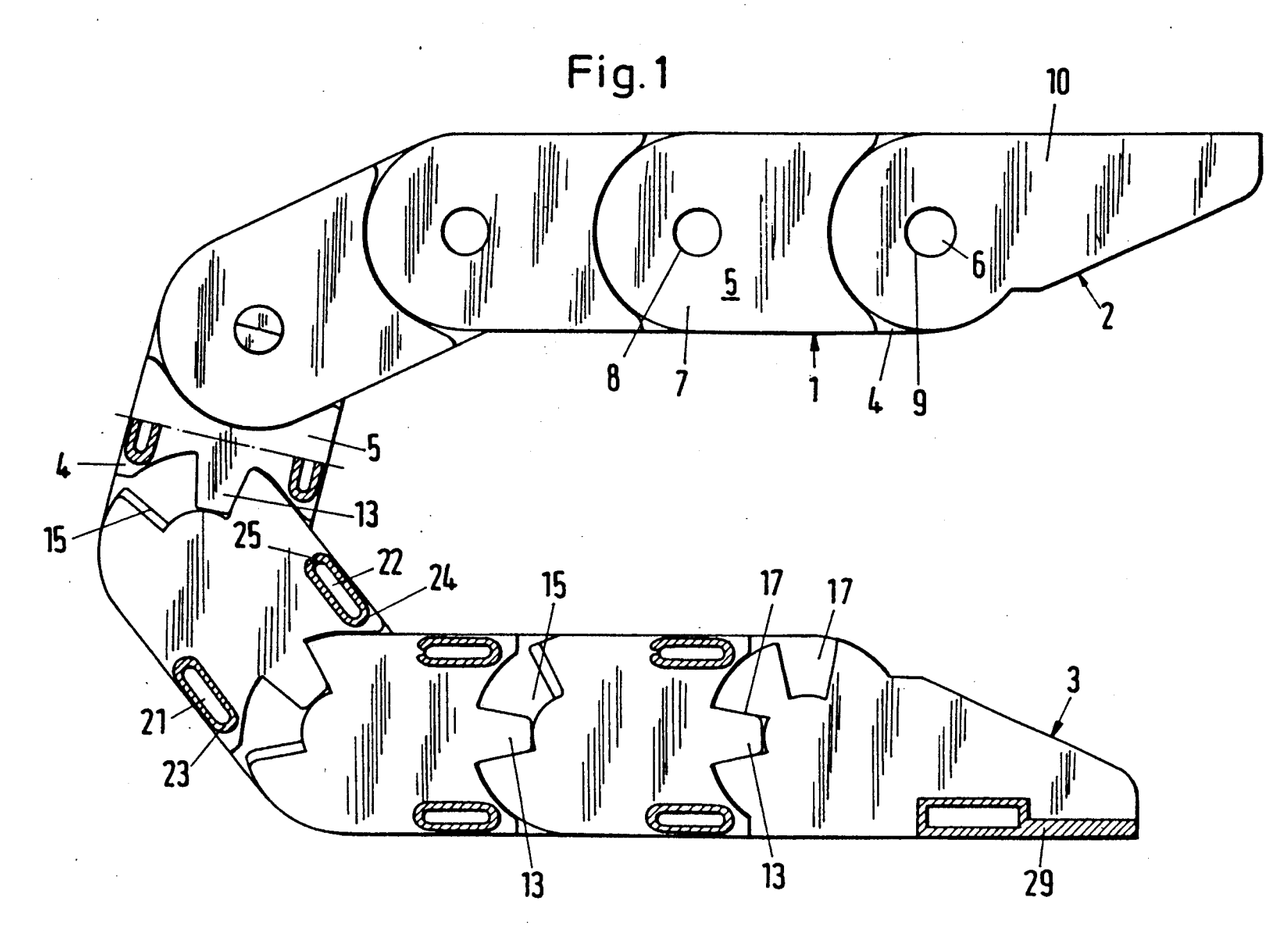
FIG. 1 is a partially cross-sectioned side view of one exemplary embodiment of the inventive feeder chain.

Referring now to the drawings in detail, the guide or feeder chain illustrated in FIG. 1 comprises a number of chain links 1 as well as a connector 2 for a movable consuming device and a connector 3 for a fixed connection. On those ends 4 of its outer side pieces 5 that ar disposed more closely together, each chain link 1 is provided with pins 6, whereas those ends 7 of the outer side pieces 5 that are disposed further apart are provided with corresponding holes 8. The pins 6 of each chain link 1 extend into holes 8 of an adjacent chain link or into corresponding holes 9 of the outer side pieces 10 of the connector 2 (see FIG. 8). The connector 3 for the fixed consuming device is provided with appropriate pins 11 on outer side pieces 12 (see FIG. 7), with these pins 11 engaging in corresponding holes 8 of the adjacent chain link 1.

In addition, the outer sides of the closer together ends 4, and the inner sides of the further apart ends 7, of the outer side pieces 5 are provided with stop means 13, 14 (see FIG. 2) that have abutment edges that extend radially relative to the axes of the holes 8 and the pins 6. The stop means 13 of the further apart ends 7 cooperate with those delimiting walls of notches 15 on the closer together ends 4 of the outer side pieces 5 that extend radially relative to the pins 6, whereas the stop means 14 cooperate with those delimiting walls of cutouts 16 on the inner walls of the further apart ends 7 of the outer side pieces 5 that extend radially relative to the holes 8. As shown in FIG. 1, when the guide or feeder chain is bent, each chain link 1 attains relative to the adjacent chain link 1 a specific pivot angle whereby the delimiting walls of the stop means 13 rest via a large surface area against the delimiting walls of the notches 15, thereby preventing a further bending. Since the delimiting walls of the stop means 14 (not illustrated) also rest against the delimiting walls of the cutouts 16 at the same pivot angle, the transfer of force between the adjacent chain links is improved. In contrast, when the feeder chain is disposed in its extended state, the other delimiting walls of the stop means 13, 14 rest against the other delimiting walls of the notches 15 or cutouts 16. This state has been attained by the two bottom chain links of the feeder chain illustrated in FIG. 1.

Figure 7:
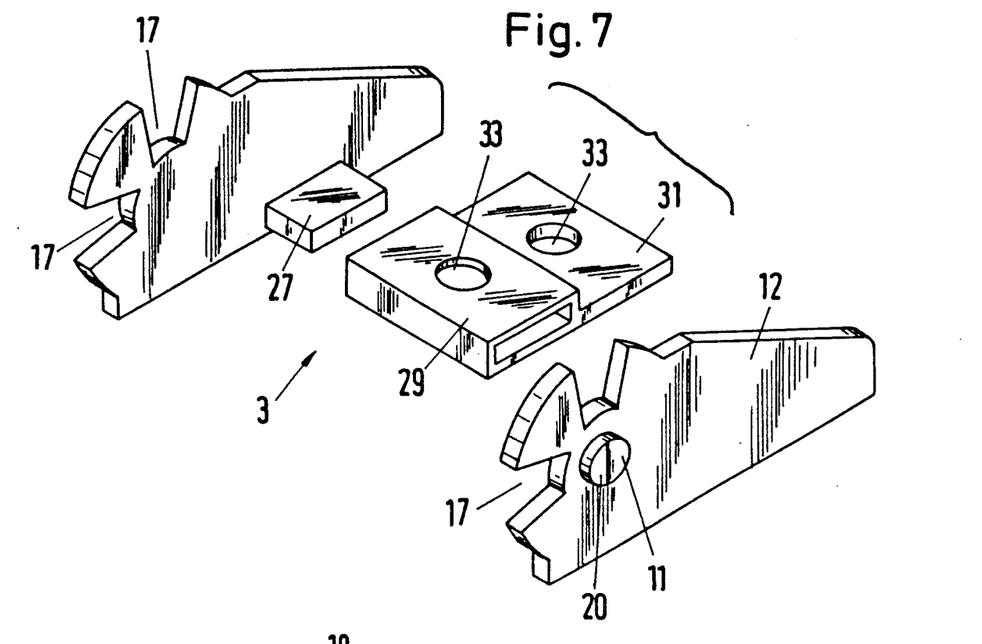
FIG. 7 is a perspective exploded view of a connector of the feeder chain of FIG. 1 for securement to a fixed connector.

As shown in FIGS. 1 and 7, the connectors 3 are provided with notches 17, those delimiting walls of which that extend radially relative to the pins 11 being angularly spaced from one another in such a way as to correspond to the angular spacing of the radial delimiting walls of the stop means 13. As a result, the adjoining chain link 1 cannot bend relative to the connector 3. The two notches 17, which are offset relative to one another by b 90°, enable a mounting of the connector 3 on a fixed connection at an offset angle of 90°. Due to the symmetrical construction of the connector 3, this connector can in addition be rotated at every angular position in such a way that each of its outer side pieces 12 cooperates with another outer side piece 5 of the adjoining chain link, resulting in considerable variation with regard to how it can be mounted.

Figure 8:
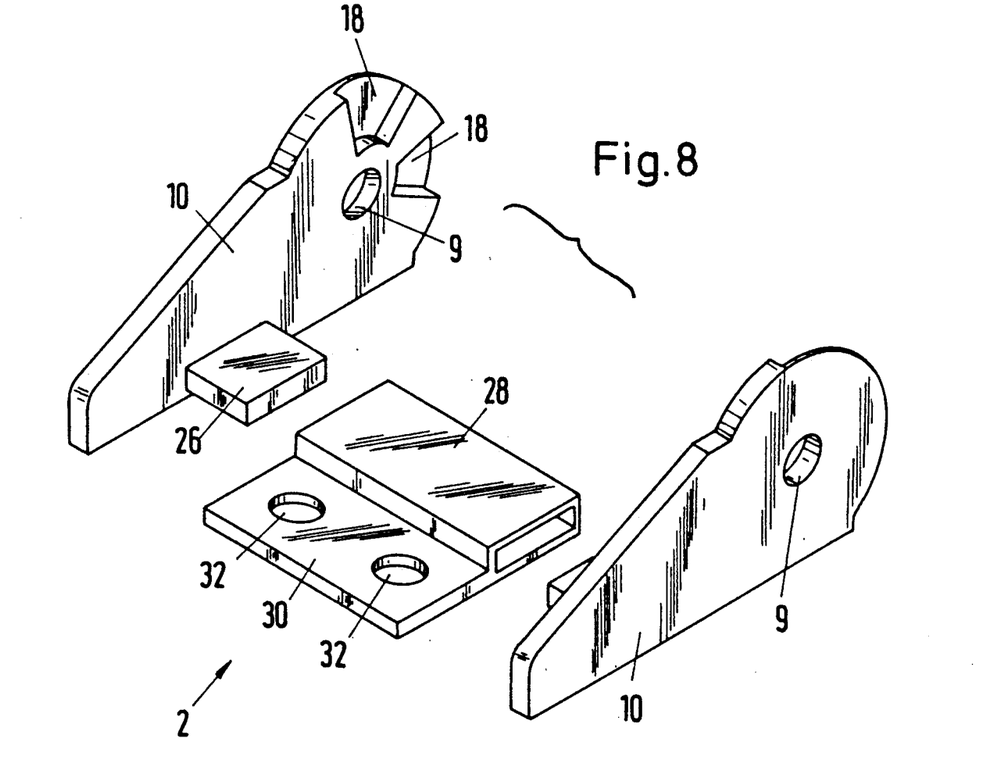
FIG. 8 is a perspective exploded view of a connector of the feeder chain of FIG. 1 for securement to a movable consuming device.
Figure 9:
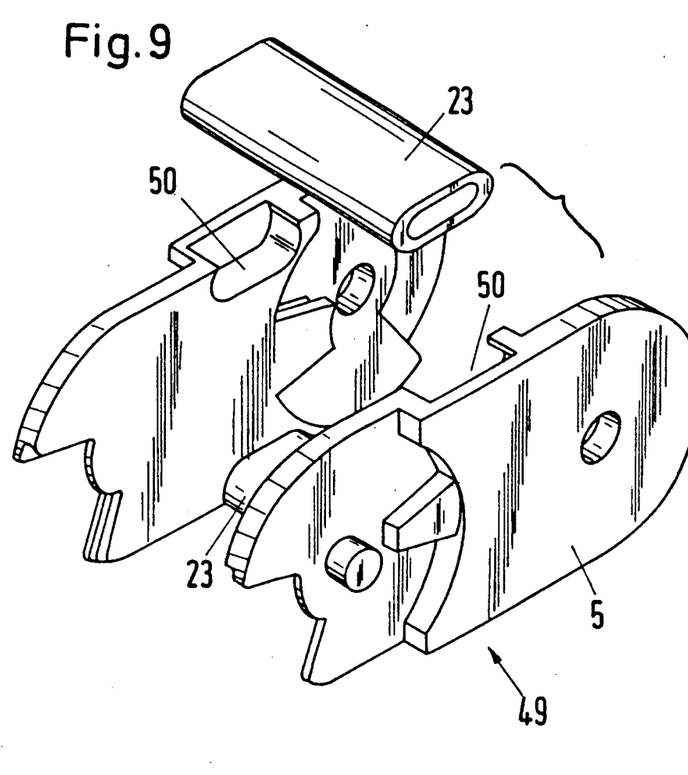
FIG. 9 is a perspective exploded view of a chain link having an alternative securement for the tubular piece in recesses of the outer side pieces.
Figure 10:
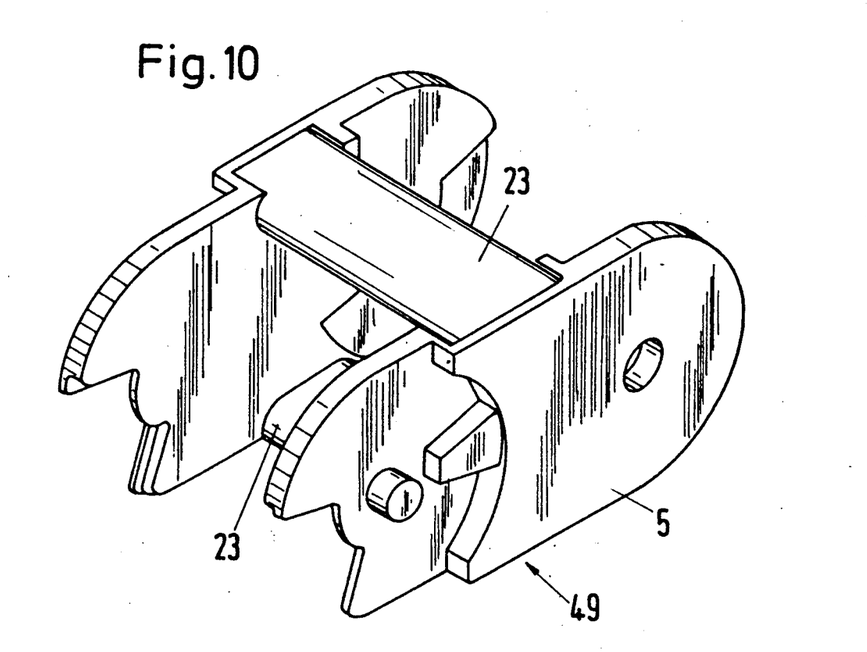
FIG. 10 is a perspective view of the chain link of FIG. 9 with the tubular piece inserted.
Figure 11:
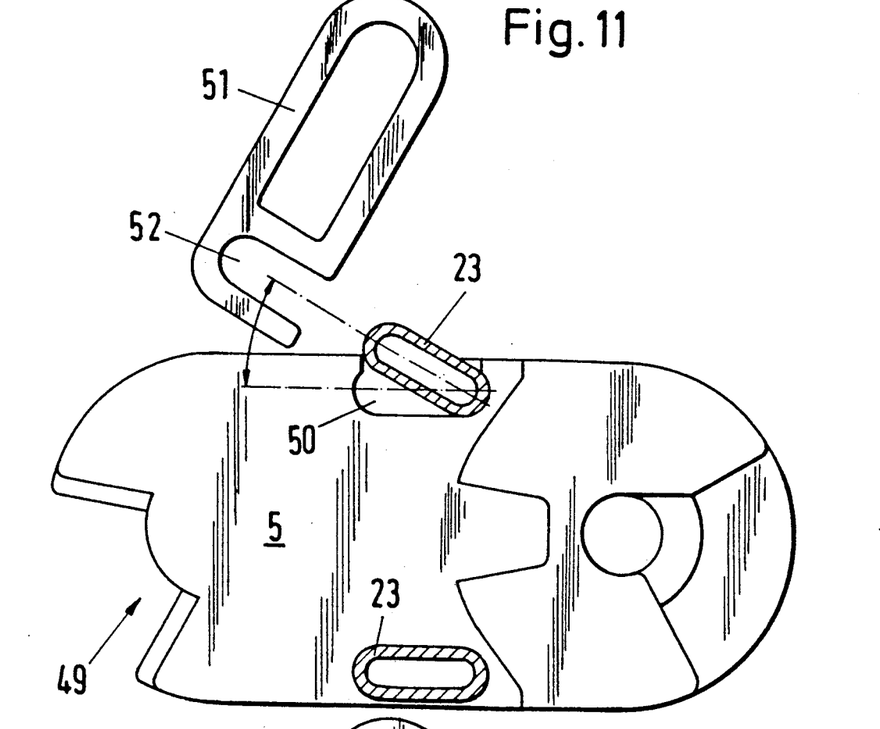
FIG. 11 is a longitudinal cross-sectional view of the chain link of FIG. 10 showing the tubular piece partially inserted into the recess.
Figure 12:
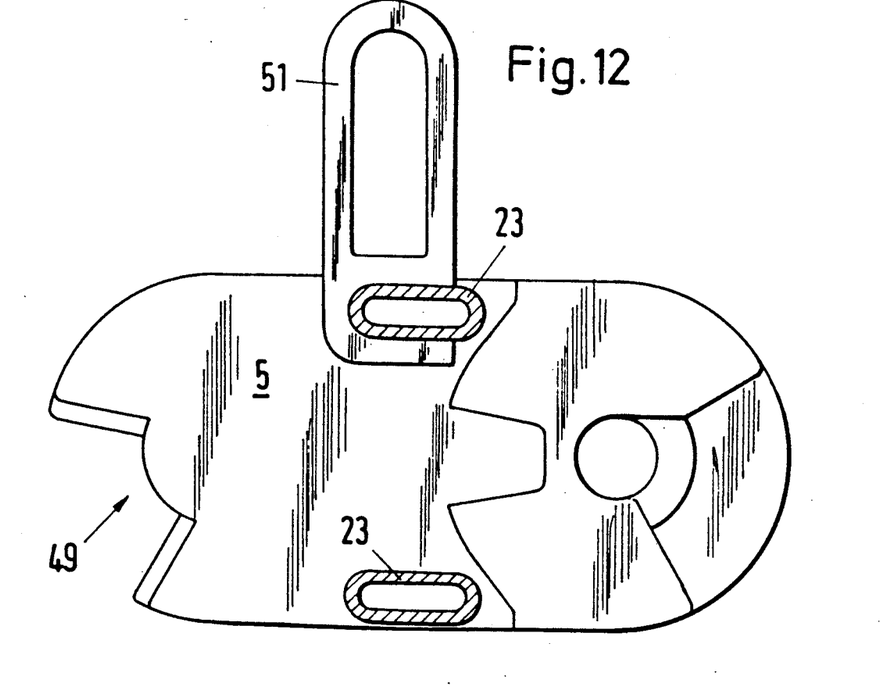
FIG. 12 is a longitudinal cross-sectional view of the chain link of FIG. 11 with the tubular piece completely inserted, with a tool being shown in place on the tubular piece.

The same is true for the connector 2, which as shown in FIG. 8 has two cutouts 18 that are offset by 90° and are provided with delimiting walls that extend radially relative to the holes 9. The angular spacing of the delimiting walls and the cutouts 18 again coincides with the angular spacing of the radial delimiting walls of the stop means 14 of the chain links 1, so that with every assembly arrangement of the chain link 1 on the connector 2, these two components cannot pivot relative to one another. Again, the connector 2 can be mounted in four different ways relative to the chain link 1, resulting in considerable variation relative to the mounting of the connector 2 on a movable consuming device.

It should be noted that all of the pins 6, 11 have an inclined surface 19, 20 so that the pins can easily be inserted into the holes 8, 9 of the adjoining chain link 1 or connector 2, so that it is merely necessary to overcome a crosspiece between the cutouts 16, 18 and the holes 8, 9, whereby it is also possible to chamfer these crosspieces in the direction of insertion.

Figure 2:
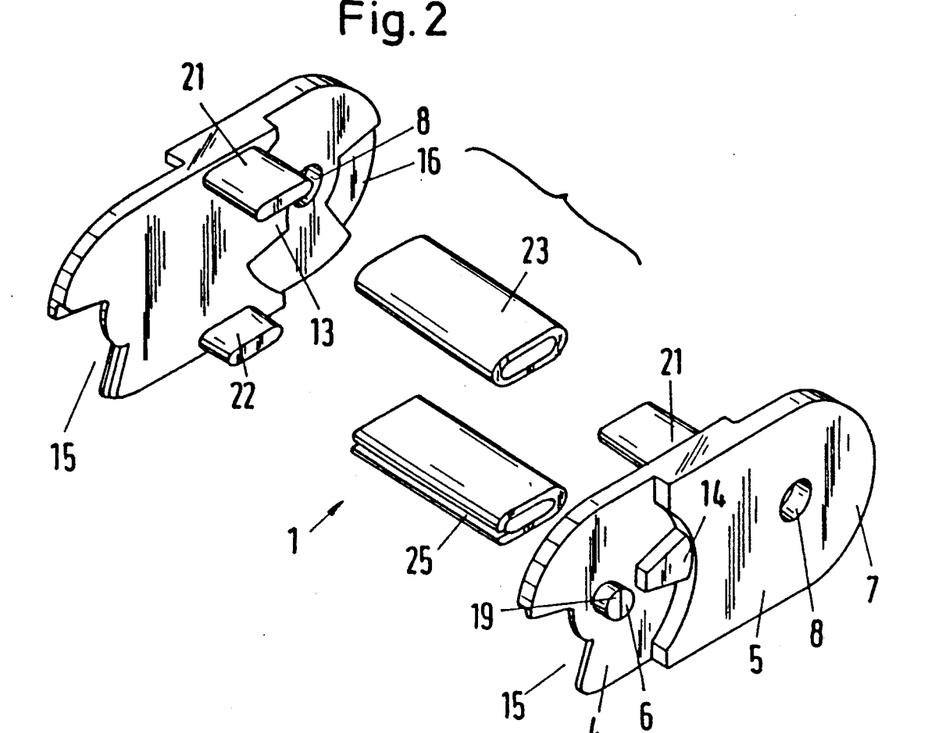
FIG. 2 is a perspective exploded view of a chain link of the feed chain of FIG. 1.

As shown particularly clearly in FIG. 2, the two edges of the inner wall of the outer side pieces 5 are respectively provided with a long projection 21 or a short projection 22. Placed on the integrally molded projections 21, 22 are unslotted tubular pieces 23, and tubular pieces 24 that have a longitudinal slot 25 on one rounded outer side, whereby the unslotted tubular pieces 23 are associated with the long projections 21. Since the tubular pieces 23, 24 have a force fit on the projections 21, 22, these tubular pieces 23, 24 form crosspieces that securely interconnect the outer side pieces 5 of the chain links. However, the longitudinal slot 25 of the tubular piece 24 permits the guide or feeder chain to be opened on one side for the insertion of power or feed lines, with this being accomplished by widening the tubular piece 24 at the longitudinal slot 25 and pressing the tubular piece over the flat sides of the short projection 22. By providing the tubular pieces 23, 24 with two flattened outer sides that are spaced relatively close together, and with two rounded outer sides that are spaced relatively far apart, a high stability of the construction is achieved that at the same time provides a relatively large interior space for the disposition of the feed lines.

As can be seen from FIG. 1 in conjunction with FIGS. 7 and 8, the edge regions of the outer side pieces 10, 12 of the connectors 2, 3 are provided with respective projections 26, 27. These projections enter into a force fit with tubular pieces 28, 29 that are each provided with connection lugs 30, 31 and holes 32, 33 to enable mounting on a movable consuming device or a fixed connection. The tubular pieces 28, 29 have no slots since they must provide a stable connection between the outer side pieces 10 or 12 and because, as a consequence of the fact that the tubular pieces 28, 29 are disposed on only one side of the connectors 2, 3, feed lines can be introduced in an unobstructed manner.

Figure 3:
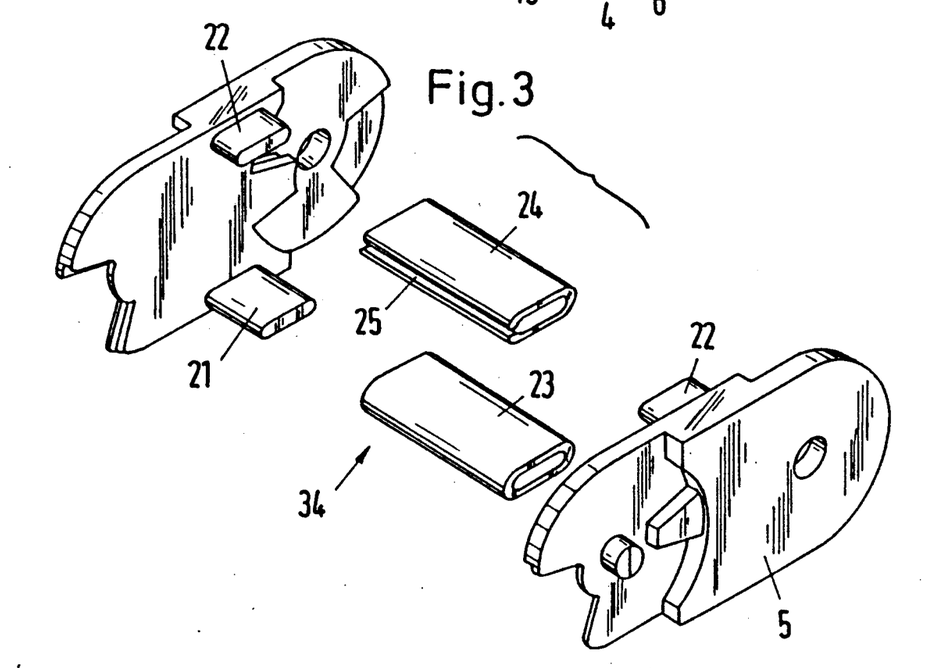
FIG. 3 shows another exemplary embodiment of an inventive chain link where the position of a longitudinally slotted and an unslotted tubular piece, as well as the associated projections, have the reverse position of that of the embodiment illustrated in FIG. 2.

With the chain link 34 illustrated in FIG. 3, in contrast to the chain link 1 of FIG. 2, the short projections 22 and the associated longitudinally slotted tubular pieces 24 are disposed on the upper edge of the outer side pieces 5, whereas the long projections 21 and the associated unslotted tubular pieces 23 are disposed on the lower edge of the outer side pieces 5. In this way, the interior of the feeder chain is accessible from the other side for the introduction of feed lines.

Figure 4:
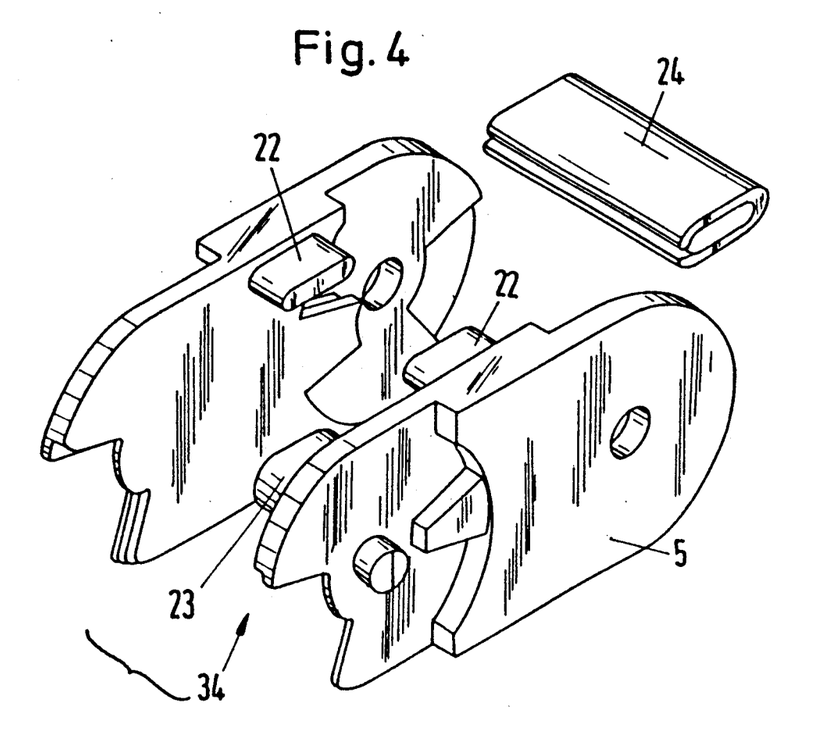
FIG. 4 is a perspective view of the chain link of FIG. 3, with the longitudinally slotted tubular piece being removed for insertion of feed lines.
Figure 5:
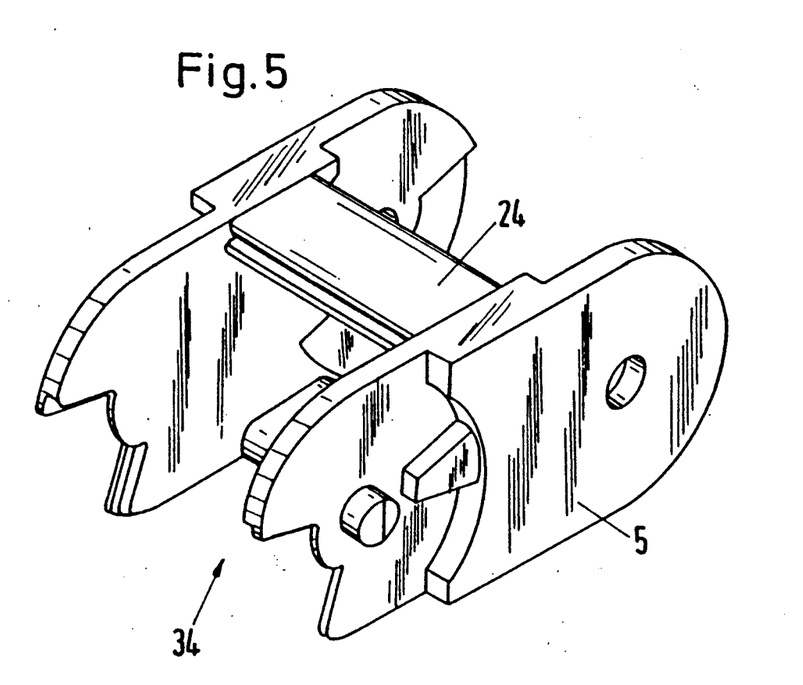
FIG. 5 shows the chain link of FIG. 4 with the longitudinally slotted tubular piece having been inserted.

As shown in FIGS. 4 and 5, the chain links 34 are first preassembled by pressing the unslotted tubular pieces 23 onto the long projections 21, thereby already providing a stable chain link. Feed lines can then be introduced through the large free space that is provided between the short projections 22. Finally, the chain link 34 is closed by pressing the slotted tubular piece 24 onto the short projections 22 in the longitudinal direction of the feeder chain.

Figure 6:
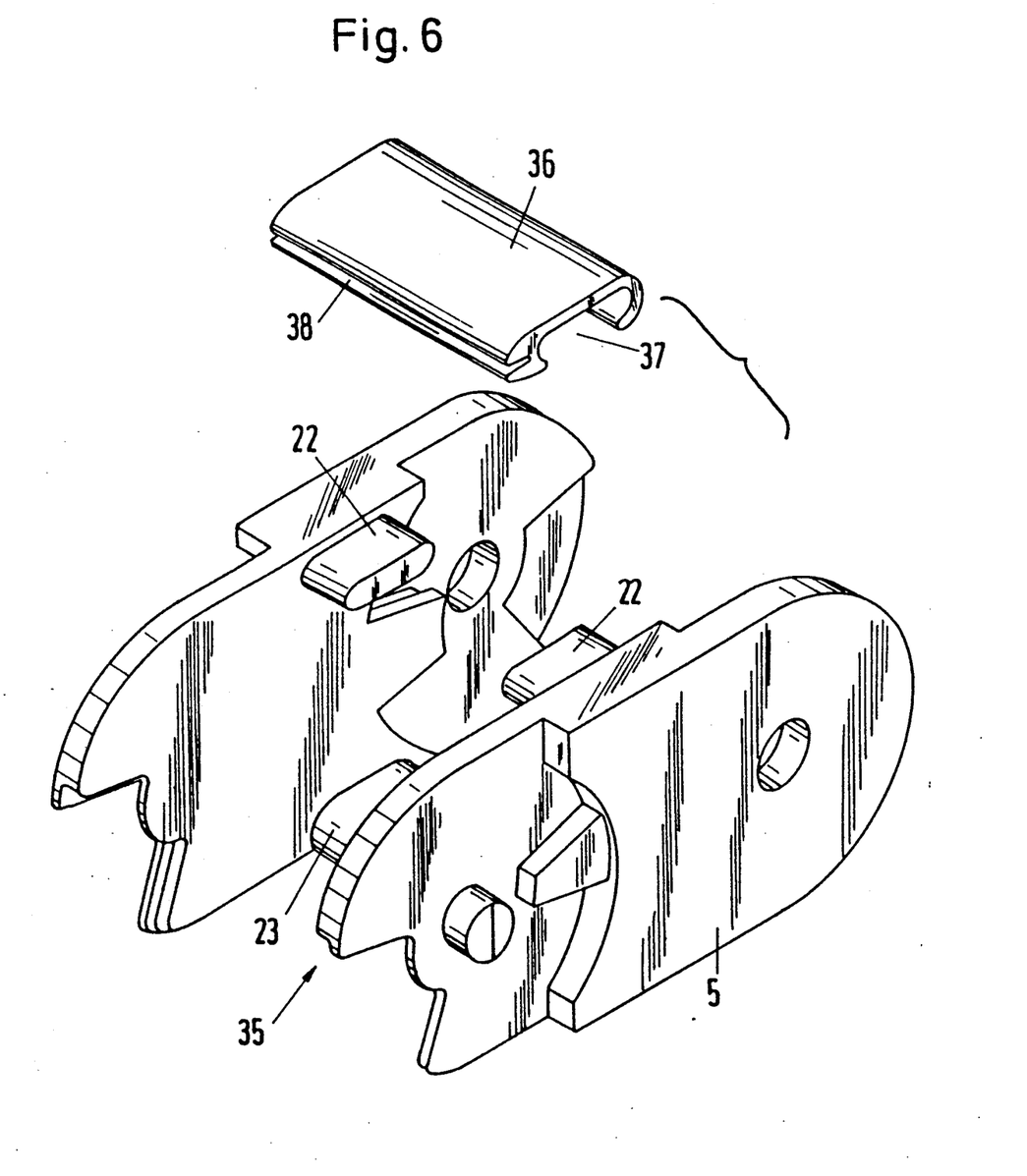
FIG. 6 is a perspective view of a chain link of another exemplary embodiment of the inventive feeder chain where a longitudinal slot is disposed on one flattened outer side of a tubular piece, and this longitudinally slotted tubular piece is removed.

FIG. 6 shows a similar chain link 35, the longitudinally slotted tubular piece 36 of which, in contrast to the longitudinally slotted tubular piece 24 of the chain link 34, has a longitudinal slot 37 that occupies approximately one entire flattened outer side. Via this longitudinal slot 37, the tubular piece 36 can be easily inserted upon the short projections 22 of the outer side pieces 5. To remove the tubular pieces 36, the same are provided with a longitudinal groove 38 into which can be placed the blade of a screwdriver in order to lift the tubular piece 36 off.

FIGS. 9 to 12 show an alternative embodiment of the inventive guide or feeder chain, which is provided with chain links 49, the upper side of the outer side pieces 5 of which are provided with recesses 50 into which a tubular piece 23 can be positively inserted in a formlocking manner. For this purpose, the recesses 50 are gated or are open toward the top and provided with undercuts into which the rounded-off narrow sides of the tubular pieces 23 fit. The assembly and removal of the tubular pieces 23 is best effected with a tool 51, the opening 52 of which fits onto the profile of the tubular piece 23. In this embodiment of the feeder chain, the chain links 49 on one side can be rapidly opened in order to remove defective feed lines from the chain, or to place new feed lines therein.

It should be noted that all of the individual parts of the inventive guide or feeder chains can be made of a suitable plastic, or of a metal, especially a lightweight metal.

The present invention is, of course, in no way restricted to the specific disclosure of the specification and drawings, but also encompasses any modifications within the scope of the appended claims.

What is claimed is:

1. In a feeder chain for the supply of all types of consumable material to units that move on tracks, with said chain comprising a plurality of chain links and having a continuous inner space for feed lines, whereby said chain links have pivotably interconnected outer side pieces that are provided with stop means to delimit the mutual pivot angle, with each chain link being provided with two detachable crosspieces for interconnecting said outer side pieces thereof, the improvement wherein:

said crosspieces are tubular pieces, at least one of which is insertable via a force fit onto projections that are disposed on facing sides of said side pieces, and one of said tubular pieces is provided with a longitudinal slot, and the other of said tubular pieces is unslotted, with said longitudinally slotted tubular pieces of all of said chain links being disposed on only one side of said chain.

2. A feeder chain according to claim 1, in which each of said tubular pieces has an approximately constant thickness, has two oppositely disposed flattened outer sides, and has two other oppositely disposed rounded-off sides, whereby the distance between said flattened sides is less than the distance between said rounded-off sides, with said projections having corresponding flattened sides that are disposed parallel to longitudinal narrow sides of said outer side pieces of said chain links.

3. A feeder chain according to claim 1, in which said longitudinal slot is disposed on one of said rounded-off sides of said tubular piece.

4. A feeder chain according to claim 1, in which said longitudinal slot is disposed on one of said flattened sides of said tubular piece and has approximately the same dimension as that flattened side in the longitudinal direction of said chain.

5. A feeder chain according to claim 4, in which one of said rounded-off sides of said tubular piece is provided with a longitudinal groove.

6. A feeder chain according to claim 1, in which those projections of said outer side pieces that are associated with said longitudinally slotted tubular pieces are shorter than those projections that are associated with said unslotted tubular pieces.

7. A feeder chain according to claim 2, which has oppositely disposed end links in the form of connectors, each of which has two outer side pieces connected by a tubular piece that is provided with a securement lug for securement to a fixed connection or a movable consuming device.

8. A feeder chain according to claim 7, in which said tubular pieces are made of a lightweight metal.

9. A feeder chain according to claim 2, in which said outer side pieces of said chain links are provided with recesses that are gated and provided with undercuts; in which one of said tubular pieces of each chain link is insertable onto said projections; and in which the other of said tubular pieces is disposed in said recesses of said outer side pieces.

10. A feeder chain according to claim 9, in which said other of said tubular pieces, after being placed in said recesses, are adapted to be secured to said outer side pieces in a positive and formlocking manner by being rotated about their longitudinal axes.

* * * * *